United States Patent
Viethen et al.

(10) Patent No.: US 9,471,085 B2
(45) Date of Patent: Oct. 18, 2016

(54) PEDAL SYSTEM FOR THE GENERATION OF A FORCE PATH HAVING HYSTERESIS

(71) Applicant: Hella KGaA Hueck & Co., Lippstadt (DE)

(72) Inventors: Claus Viethen, Erwitte (DE); Werner Austermeier, Schloβ Holte-Stukenbrock (DE)

(73) Assignee: HELLA KGAA HUECK & CO., Lippstadt (DE)

( * ) Notice: Subject to any disclaimer, the term of this patent is extended or adjusted under 35 U.S.C. 154(b) by 0 days.

(21) Appl. No.: 14/646,832

(22) PCT Filed: Nov. 4, 2013

(86) PCT No.: PCT/EP2013/072896
§ 371 (c)(1),
(2) Date: May 22, 2015

(87) PCT Pub. No.: WO2014/079672
PCT Pub. Date: May 30, 2014

(65) Prior Publication Data
US 2015/0277479 A1    Oct. 1, 2015

(30) Foreign Application Priority Data

Nov. 23, 2012 (DE) .......................... 10 2012 111 315

(51) Int. Cl.
| | |
|---|---|
| G05G 1/30 | (2008.04) |
| G05G 5/03 | (2008.04) |
| G05G 1/44 | (2008.04) |
| B60K 26/02 | (2006.01) |

(52) U.S. Cl.
CPC ............... *G05G 5/03* (2013.01); *B60K 26/021* (2013.01); *G05G 1/44* (2013.01); *B60K 2026/023* (2013.01); *Y10T 74/20888* (2015.01)

(58) Field of Classification Search
CPC .......... G05G 1/44; G05G 1/445; G05G 5/03; B60K 26/021; B60K 2026/023; Y10T 74/20888
See application file for complete search history.

(56) References Cited

U.S. PATENT DOCUMENTS 7,278,337 B2 * 10/2007 Solta ...................... B60K 26/02
74/513

FOREIGN PATENT DOCUMENTS

| DE | 4426549 A1 | 2/1996 | |
|---|---|---|---|
| DE | 19755980 A1 | 6/1999 | |
| DE | 102004027499 A1 | 12/2005 | |
| DE | 102007000218 A1 | 10/2007 | |
| DE | 102014106329 A1 * | 11/2015 | ............. B60K 26/02 |

(Continued)

*Primary Examiner* — Adam D Rogers
(74) *Attorney, Agent, or Firm* — Husch Blackwell LLP

(57) ABSTRACT

A pedal system for the generation of a force path having hysteresis when a pedal is actuated. The system includes a pedal that is supported such that it can pivot between at least a first position and a second position. The pedal has a sliding element having a sliding surface, as well as a bearing device having at least one friction surface for supporting the sliding surface of the sliding element. The bearing device is supported such that it can pivot about a bearing axle. The friction surface and the sliding surface are in contact with one another in a first contact section when the pedal is in the first position, and are in contact with one another in a second contact section when the pedal is in the second position. The first contact section and the second contact section have different lever arms to the bearing axle.

9 Claims, 4 Drawing Sheets

(56) References Cited

FOREIGN PATENT DOCUMENTS

| EP | 1936470 A1 | 6/2008 |
| IT | EP 2803520 A1 * | 11/2014 | ........... B60K 26/021 |
| WO | 0181110 A1 | 11/2001 |
| WO | WO 2009087013 A1 * | 7/2009 | ............... G05G 1/38 |

* cited by examiner

Fig. 7
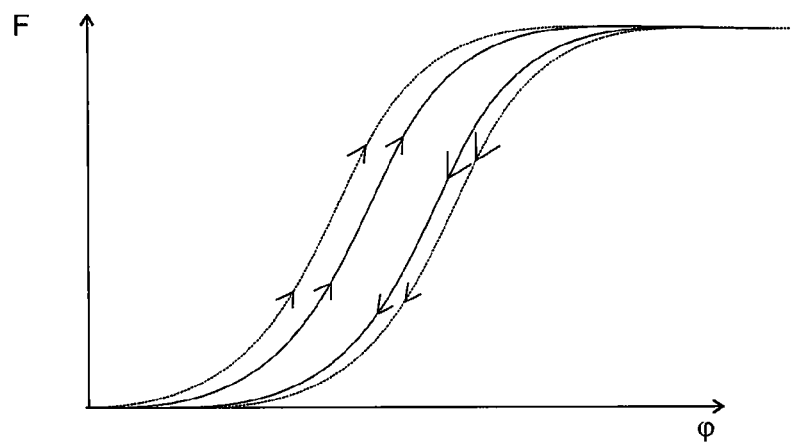
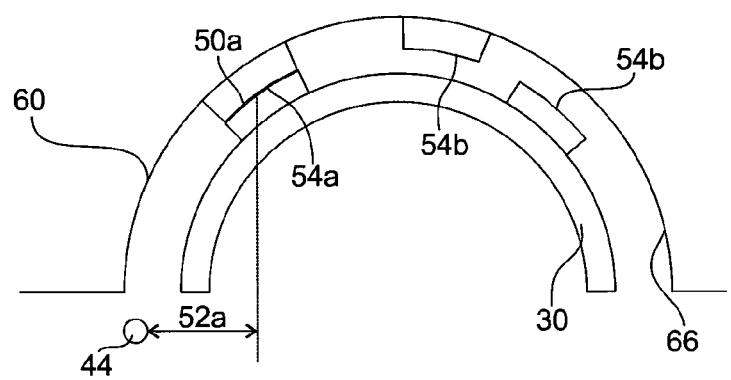
Fig. 8
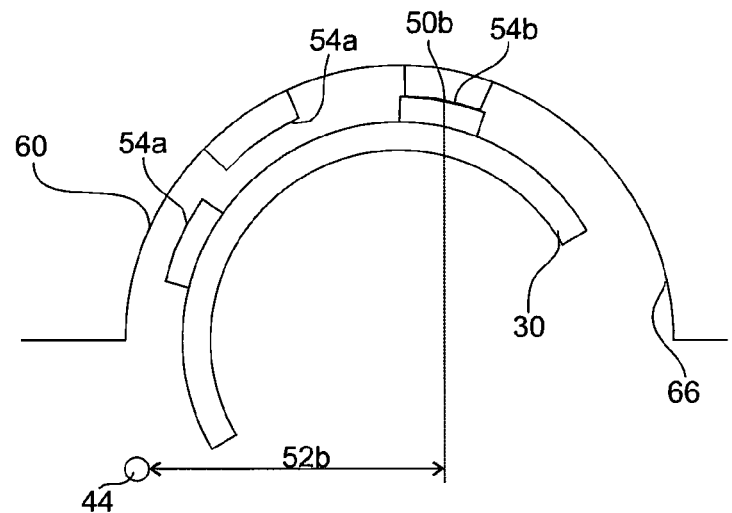
Fig. 9

PEDAL SYSTEM FOR THE GENERATION OF A FORCE PATH HAVING HYSTERESIS

CROSS REFERENCE

This application claims priority to International Application No. PCT/EP2013/072896, filed on Nov. 4, 2013, which itself claims priority to German Application No. 10 2012 111315.7, filed Nov. 23, 2012, both of which are hereby incorporated by reference.

FIELD OF TECHNOLOGY

The present invention relates to a pedal system for the generation of a force path having hysteresis when a pedal is actuated, as well as a method for generating a force path having hysteresis when a pedal is actuated.

BACKGROUND

The use of pedal systems having hystereses in a force path is known. Thus, for example, the gas pedal in motor vehicles is frequently supported with a force path of this type. This means that a different force path is made available by the hysteresis for the pressing of the gas pedal than is made available when releasing the gas pedal. In particular, when pressing on the gas pedal, a higher resistance is implemented than during the releasing of the gas pedal.

However, with known pedal systems it is disadvantageous that the hysteresis is difficult to adjust, or can only be adjusted with a great deal of effort. In particular the width of such an hysteresis can only be modified with a great deal of design effort.

SUMMARY OF THE INVENTION

The object of the present invention is to remedy the disadvantages described above, at least in part. In particular it is the object of the present invention to make available a simple and cost-effective adjustment of the power path having hysteresis, in particular the hysteresis width.

A pedal system according to the invention serves to generate a force path having hysteresis when a pedal is actuated. Accordingly, such a pedal system has a pedal that is supported such that it can pivot between at least a first and a second position. This pedal has a sliding element having a sliding surface. Furthermore, a bearing device having at least one friction surface for supporting the sliding surface of the sliding element is provided with a pedal system according to the invention. A pedal system according to the invention is distinguished in that the bearing device is pivotably supported such that it can pivot about a bearing axle. Furthermore, the friction surface and the sliding surface are in contact with one another in a first contact section when the pedal is in the first position, and in a second contact section when the pedal is in the second position. The first contact section and the second contact section have different lever arms to the bearing axle.

A pedal system according to the invention is used in particular with motor vehicles, e.g. for the gas pedal in motor vehicles. An hysteresis is to be understood, in particular, as a force path curve having a different force path with respect to pressing on the pedal than for releasing the pedal. In particular, a particularly wide hysteresis displacement between these two curves is advantageous for the feeling of the pedal when actuating the pedal.

Preferably a frame is provided with a pedal system according to the invention, in which the individual components are disposed, in particular the pedal and the bearing device, preferably supported such that they can pivot. Bearing devices, or support surfaces, respectively, or even additional friction surfaces, are provided for this.

A sliding surface and a friction surface are preferably to be understood, in the scope of the present invention, as surfaces that can come in contact with one another, at least in sections. This contact occurs at the respective contact section, and leads to a relative movement of the sliding surface and the friction surface with respect to one another during the movement of the pedal from the first position to the second, and vice versa. In addition, a spring device may be provided, which pre-tensions the pedal from one position to the other. In particular, a pre-tensioning direction occurs toward the first position, such that when the pedal is moved from the first position to the second, the spring force must be overcome.

In a manner according to the invention, in particular with the use of such a spring force, the pedal force occurring by pressing the pedal is calculated as follows. As such, on one hand, the spring force is overcome by compressing this spring element. At the same time, this spring force supports the spring device, which preferably engages with the bearing device at the contact section on the side of the bearing axle opposite the two contact sections. The spring force generates a corresponding normal force on the contact section, by means of its support, which in turn is responsible for the frictional force when the sliding surface slides over the friction surface at the contact section. The normal force is dependent, in turn, on a lever arm, which is located between the respective contact section and the bearing axle. The longer this lever arm is, the lower the normal force that occurs. In other words, this spring force is added to the frictional force when actuating the pedal from the first position to the second position against the spring force, which frictional force is affected by the normal force at the respective contact section. The overall pedal force during the movement of the pedal from the first position to the second position is thus the sum of the spring force and the frictional force.

If the pedal is then released, thus returned from the second position to the first position, then the spring force is still applied to the pedal, which can be expended by slowly releasing the pedal. In this situation, however, the frictional force at the opposite side of the bearing axle supports this retaining by the spring force, and must be deducted from the spring force with regard to the pedal force that can be felt. The overall pedal force during the returning of the pedal from the second position to the first position is calculated in this embodiment from the difference between the spring force and the corresponding frictional force between the sliding surface and the friction surface in the contact section.

In a manner according to the invention, it is then possible to adjust the actual overall force at the pedal, thus the pedal force, particularly easily, because the lever arm of the respective contact section for the respective position in the movement of the pedal between first and the second position can be modified easily in terms of its design and geometry. If two or more contact sections are provided, then different lever arms, and thus different normal forces for the tribological pairing at the respective contact section, can be made available for the respective movement step between the first and second position. This sliding friction, as frictional force, is accordingly added to the constant spring force during the actuation from the first position into the second position, and subtracted from this spring force during the movement from the second position into the first position. Thus, in a structurally simple and cost-effective manner, by adjusting the lever arms, a structural variation of the hysteresis, in particular the hysteresis width, can occur. Further changes to the overall system are no longer necessary. Instead, it is sufficient to adjust the sliding surface and/or the friction surface such that there are different lever arms for the first and second contact surfaces.

As a matter of course, it is also possible, within the scope of the invention, that the kinematic reversal is carried out, thus the friction surface and the sliding surface are made available as a frictional pairing between the sliding element and a frame for the pedal system. This shall be explained in greater detail below, in particular in reference to Claim 8 of the present invention.

A pedal system according to the invention can be further developed in this respect, in that the contact sections are formed by raised sections of the sliding surface and/or the friction surface. In other words, there are raised and recessed sections, such that only the raised sections can come in contact with one another. These raised sections can also be referred to as contact surfaces, which make the respective contact section available at the point in time when they are in contact with one another. This relates to a particularly simple and cost-effective design for the present invention, because the raised sections, and thus the respective contact surfaces, can be made available for forming a contact section by means of a simple geometrical modification of the surface of the sliding surface and/or the friction surface. The positioning of the respective lever arm can occur in an explicit manner, such that the corresponding value for the normal force, and thus for the corresponding sliding frictional force, can be defined explicitly.

A further advantage is obtained when, with a pedal system according to the invention, the friction surface and/or the sliding surface extend, at least in part, along a curve, in particular a curve having a constant curvature radius. A constant curvature radius is to be understood, accordingly, as a substantially circular or circle segment shaped design for the sliding surface and/or the friction surface. The siding surface and the friction surface preferably have an identical, or a substantially identical curvature radius, in particular at the contact surfaces forming the contact sections. Because a pedal normally moves in a rotational manner, by means of the pivotable support along a circular line, thus through an angular change, the frictional pairing between a curved friction surface and a curved sliding surface reproduces this rotational movement in an ideal manner. A conversion of the rotational movement to a translational movement is thus no longer necessary. This reduces the complexity of a pedal system according to the invention, and thus the design effort, as well as costs arising in the production thereof. At this point it should be noted that, as a matter of course, the individual contact sections can be formed not only as contact points or contact lines, but also as contact surface areas. Accordingly, instead of a single lever being formed for the corresponding contact section, a lever region is formed between the region of the contact surface that is disposed particularly close to the bearing axle and the region of the contact section of the contact surface that is spaced particularly far away from the bearing axle.

It may also be advantageous when, with the pedal system according to the invention, the contact section is designed as an inclined plane along the course of the movement of the sliding surface on the friction surface, such that they are continuously, or substantially continuously, in contact and/or out of contact over the course of the movement from the first position of the pedal to the second position of the pedal. In other words, the transition from the one contact section to the other contact section occurs smoothly, or continuously, or substantially continuously. This results in a substantially continuous, particularly steady course and/or a course without kinks for the respective force curve in the hysteresis. By this means a particularly advantageous pedal feeling is generated in the force path, and in particular, jumps or kinks are avoided in this force path. The transition thus does not occur in an abrupt manner, but rather, one contact section is slowly disengaged, while in a region in which the forces overlap, the second contact section is slowly engaged, while the movement of the sliding surface in relation to the friction surface occurs.

Another advantage is when, with a pedal system according to the invention, the contact sections are formed as contact surfaces on the sliding surface and/or the friction surface. As has already been explained, instead of contact points or contact lines functioning as the contact sections, contact surface areas may be employed. These result in an improved surface pressure, and accordingly, to an improved transmission of force between the sliding surface and the friction surface. Furthermore, they make a larger surface area available for making the desired sliding friction available as a frictional pairing. By way of example, the individual contact surfaces can be adjusted to the intended sliding friction with respect to the desired frictional constant on the surface areas. As such, coatings and/or surface processings can be applied to these contact surfaces. In particular, the frictional value can be modified in this manner. The contact surfaces are preferably adjusted to one another such that wear is reduced in this respect. This relates in particular to a reduction in material abrasion during the frictional situation.

It may likewise be advantageous when, with a pedal system according to the invention, the sliding element is designed as a separate component, and is attached to the pedal. This means that the sliding element is designed as a sliding shoe, for example, and is slid onto the pedal. Other fastening methods are also conceivable within the scope of the present invention, such as screws, rivets, adhesive, latches, clips or even a clamping. This connection can be designed such that it is reversible or it is not reversible. A reversible design for the connection between the sliding element and the pedal has the advantage that such a sliding element can be designed as an expendable part that can be replaced.

It is furthermore advantageous when, with a pedal system according to the invention, the bearing device has at least two friction surfaces, and the pedal has at least two sliding elements having sliding surfaces. The pairings of the sliding surfaces with the friction surfaces are axially spaced apart from one another in the direction of the bearing axle. This axial spacing is basically a parallel displacement of the contact sections in relation to one another. With respect to the bearing axle, a lateral tilting is effectively prevented in this manner during the actuation of the pedal. Furthermore, an enlargement of the contact surfaces, and thus an enlargement of the friction surfaces that are available, can be obtained without a decisive enlargement of the necessary structural space.

A pedal system for the generation of a force path having hysteresis when the pedal is actuated is likewise the subject matter of the present invention. A pedal actuation of this type has a pedal having a sliding element with a sliding surface, which pedal is supported such that it can pivot between at least a first position and a second position. Furthermore, a bearing device having at least one friction surface for supporting the sliding surface of the sliding element is provided. A pedal system according to the invention of this type is distinguished in that a frame is provided, in which the bearing device is supported such that it can pivot about a bearing axle. The frame has a frame friction surface and the sliding element has a frame sliding surface thereby, wherein the frame friction surface and the frame sliding surface are in contact with one another at a first contact section when the pedal is in the first position, and are in contact with one another at a second contact section when the pedal is in the second position. The first contact section and the second contact section have different lever arms to the bearing axle thereby. This embodiment of a pedal system according to the invention is an alternative to the embodiment described in the preceding paragraphs. In this manner, the frictional pairing here with the contact sections and the formation of the different lever arms is located between the sliding element and the frame that is made available. As a matter of course, it is also possible to combine this embodiment with the embodiment according to the preceding paragraphs. Accordingly, a pedal system according to the invention can have the same advantages as those described in detail in the preceding paragraphs in reference to a pedal system according to the invention. In particular, the contact sections are also formed between the frame and the sliding element in the manner described in reference to a formation thereof between the sliding element and the bearing device.

A method for generating a force path having hysteresis when a pedal is actuated, in particular having a pedal system of the present invention, is likewise the subject matter of the present invention. A method of this type is distinguished in that, when a pedal is moved from a first position to a second position, the normal force of the frictional pairing between the pedal and a friction surface, in particular by means of a variation of the lever ratios, is modified. A method of this type is used, in particular, with a pedal system according to the invention, and is accompanied by the same advantages as those described in detail in reference to a pedal system according to the invention.

BRIEF DESCRIPTION OF THE DRAWINGS

Reference is now made more particularly to the drawings, which illustrate the best presently known mode of carrying out the invention and wherein similar reference characters indicate the same parts throughout the views.

FIG. 7 shows an embodiment of a hysteresis course.

FIG. 8 shows an embodiment of a tribological pairing according to a further embodiment of a pedal system.

FIG. 9 shows the embodiment from FIG. 8, with the pedal in the second position.

DETAILED DESCRIPTION OF THE DRAWINGS

Figure 1:
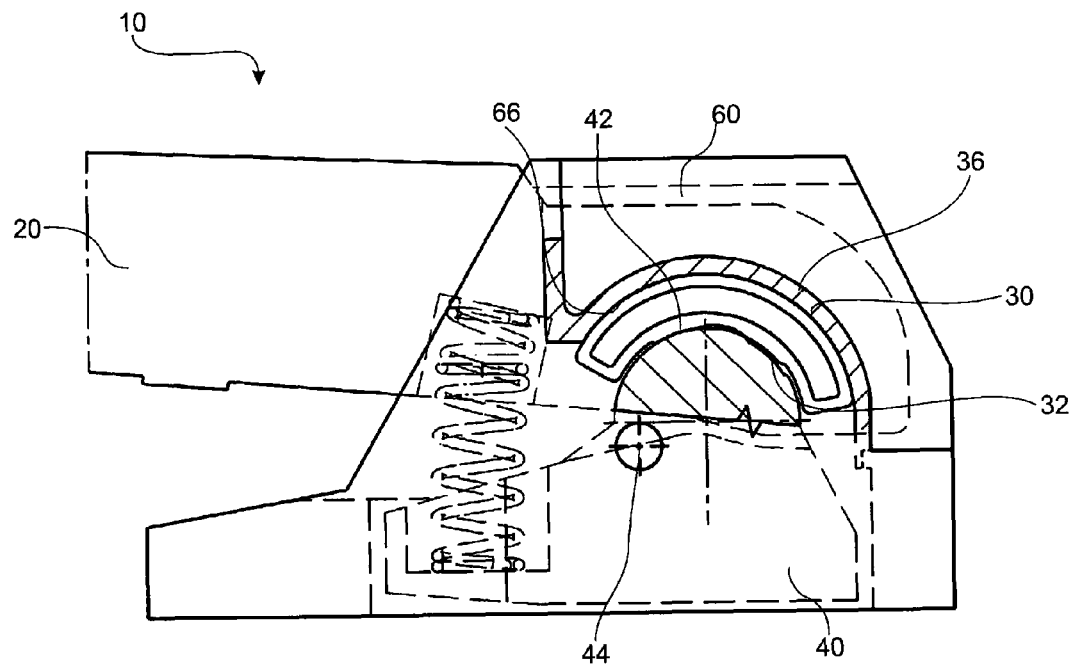
FIG. 1 shows a first embodiment of a pedal system according to the invention.
Figure 2:
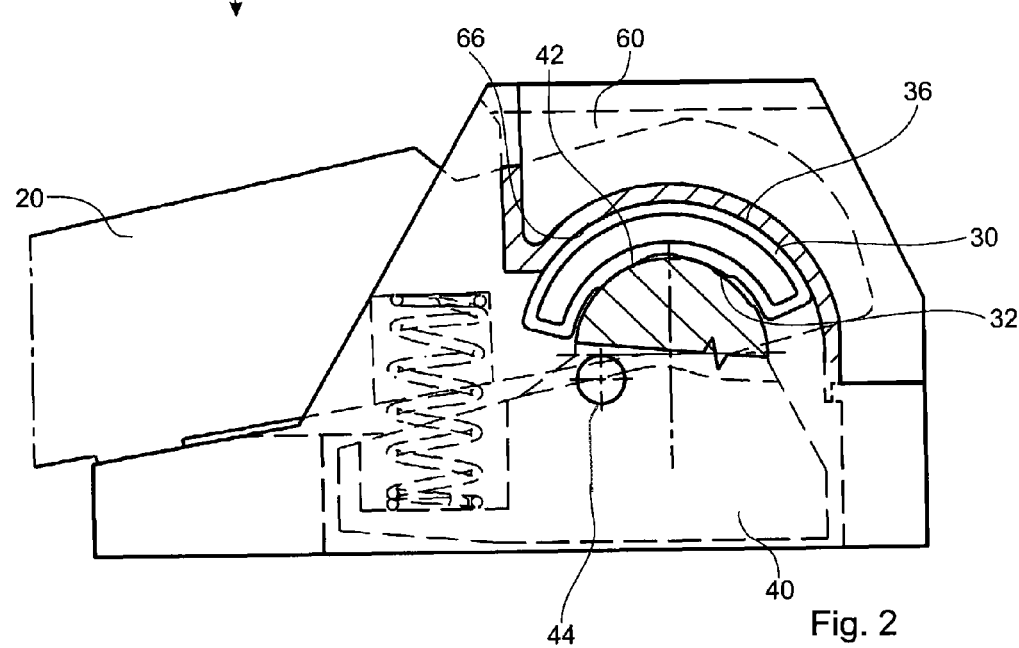
FIG. 2 shows the embodiment from FIG. 1, with the pedal in the second position.
Figure 3:
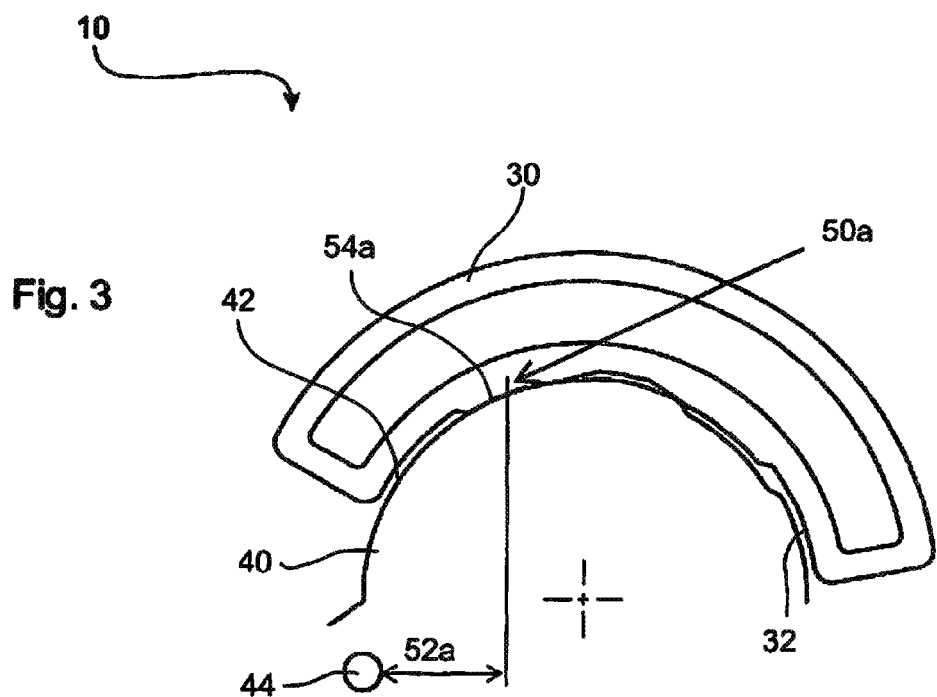
FIG. 3 shows the embodiment from FIGS. 1 and 2, with a schematic depiction of the frictional pairing.
Figure 4:
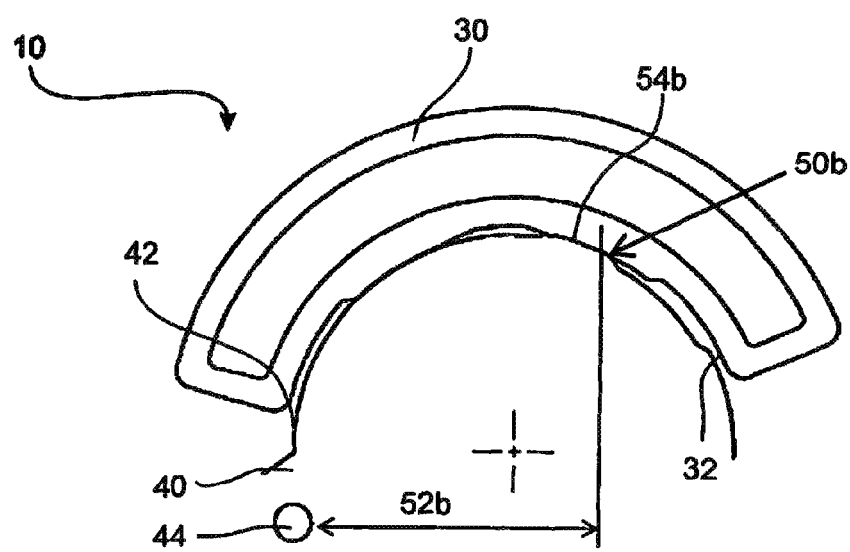
FIG. 4 shows the embodiment according to FIG. 3, with the pedal in the second position.
Figure 6:
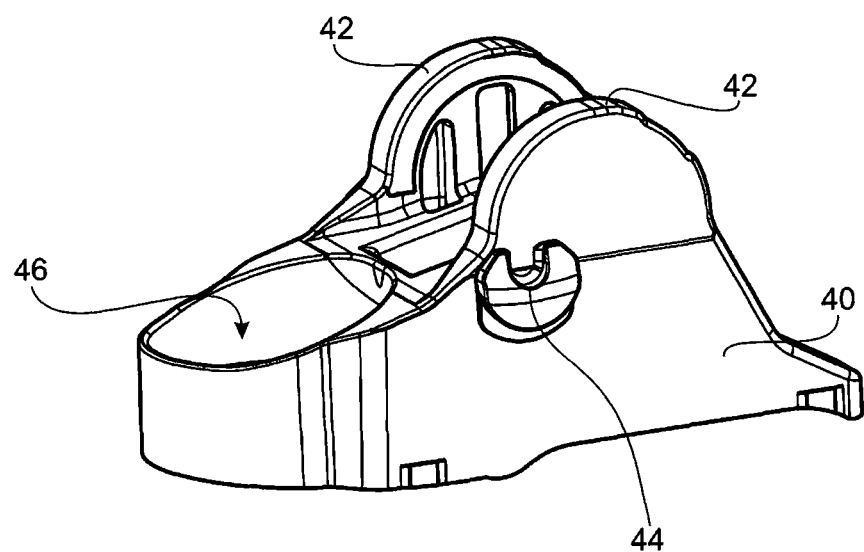
FIG. 6 shows an embodiment of a bearing device.

FIGS. 1 to 4 show a first embodiment of a pedal system 10 according to the invention, having a pedal 20. In FIGS. 1 and 3, the pedal 20 is in the first position, while in FIGS. 2 and 4 the pedal 20 is located in the second position. There is a spring element that is not shown in greater detail, which pushes the pedal 20 from the second position into the first position, and retains it there in a pretensioned manner. This spring element can be supported in a spring accommodation 46, as is depicted in FIG. 6.

Furthermore, a pedal system 10 according to this embodiment has a sliding element 30 and an associated bearing device 40. These two components are in frictional contact with one another via a sliding surface 32 of the sliding element 30 and a friction surface 42 of the bearing device 40. The bearing device 40 is disposed in a frame 60, supported such that the bearing device can pivot about a bearing axle 44. The sliding element rests against a frame friction surface 66, via a frame sliding surface 36 in the frame 60. The movement from the first position to the second position shall be explained below with reference to FIGS. 1 to 4.

When the driver begins to press the pedal 20 down, from the first position, as depicted in FIGS. 1 and 3, he must compress the spring, which is not depicted. This compression is transferred via the spring force to the right side of the bearing axle 40, where this spring force is supported via the friction surface 42, the sliding surface 32, the sliding element 30, the frame sliding surface 36 and the frame friction surface 60.

It can be readily seen in FIG. 3 that when the pedal 20 is in the first position a first contact section 50a is formed between two contact surfaces 54a. This contact section has a first lever arm 52a on the right side of the bearing axle 44. If the pedal 20 then moves to the second position, the sliding element 30 also moves from right to left, into the position shown in FIG. 4. The first contact section 50a becomes disengaged thereby, and the second contact section 50b is formed via the associated contact surfaces 54b. As can be derived from FIG. 4, a second lever arm 52b is allocated to this second contact section 50b, which lever aim is longer than the first lever arm 52a. Accordingly, the frictional normal force, and thus the occurring frictional force, is also lower in this situation than with the smaller lever arm 52a. This results in a reduction in the hysteresis width at this position, because the addition or subtraction, respectively, is carried out with a smaller value, depending on the direction of movement of the pedal 20.

Figure 5:
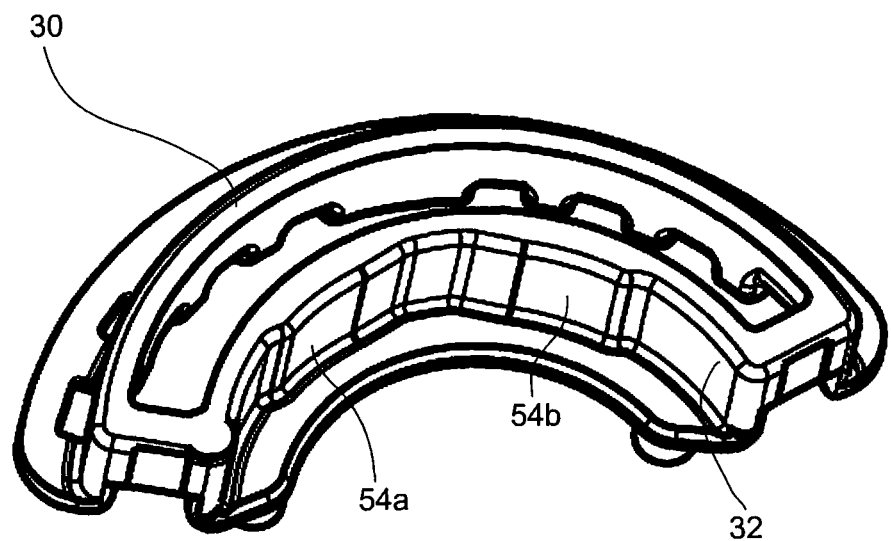
FIG. 5 shows an embodiment of a sliding element.

FIGS. 5 and 6 show two individual depictions of a sliding element 30 and a bearing device 40, which can be employed, in particular, in an embodiment according to FIGS. 1 to 4. It can be readily seen here that two friction surfaces 42 are disposed on the bearing device 40, offset to one another in the direction of the axis of the bearing axle 44. Accordingly, two sliding elements 30 can also slide thereon, such that a doubling of the frictional pairing, and thus a doubling of the contact sections 50a and 50b can be made available. Furthermore, a tilting of the pedal 20 is thus prevented.

FIG. 7 shows an exemplary course of an hysteresis curve, wherein the overall pedal force is indicated on the Y axis with an F, and the pedal angle, thus the movement between the first position and the second position of the pedal 20 is indicated on the X-axis with an cp.

FIGS. 8 and 9 show an alternative embodiment of a pedal system 10, wherein the contact sections 50a and 50b are formed here between the sliding element 30 and the frame 60. This means that the same situation with respect to different lever arms 52a and 52b is then formed by means of the contact sections 50a and 50b in relation to the corresponding contact surfaces 54a and 54b in accordance with raises on the frame friction surface 66 of the frame 60.

The preceding explanation of the embodiments describes the present invention, exclusively in the framework of examples. As a matter of course, individual features of the embodiments, to the extent that this is reasonable, can be freely combined with one another, without abandoning the scope of the present invention.

LIST OF REFERENCE SYMBOLS 10 pedal system
20 pedal
30 sliding element
32 sliding surface
36 frame sliding surface
40 bearing device
42 friction surface
44 bearing axle
46 spring accommodation
50a first contact section
50b second contact section
52a first lever arm
52b second lever arm
54a first contact surface
54b second contact surface
60 frame
66 frame friction surface

The invention claimed is:

1. A pedal system for the generation of a force path having hysteresis when a pedal is actuated, said pedal system comprising:
said pedal supported such that it can pivot between at least a first position and a second position, said pedal including:
a sliding element with a sliding surface,
a bearing device having at least one friction surface for supporting the sliding surface of the sliding element,
wherein the bearing device is supported such that it can pivot about a bearing axle,
and the friction surface and the sliding surface are in contact with one another in a first contact section when the pedal is in the first position, and are in contact with one another in a second contact section when the pedal is in the second position,
wherein the first contact section and the second contact section have different lever arms to the bearing axle.

2. The pedal system according to claim 1, wherein the contact sections are formed by at least one of: raised sections of the sliding surface and the friction surface.

3. The pedal system according to claim 1 wherein at least one of the friction surface and the sliding surface extends, at least in sections, along a curve having a constant curvature radius.

4. The pedal system according to claim 1 wherein the contact sections are formed as inclined planes along the course of the movement of the sliding surface on the friction surface, such that they are at least one of continuously in contact and not in contact over the course of the movement from the first position of the pedal to the second position of the pedal.

5. The pedal system according to claim 1 wherein the contact sections are formed as contact surfaces on at least one of the sliding surface and the friction surface.

6. The pedal system according to claim 1 wherein the sliding element is formed as a separate component, and is attached to the pedal.

7. The pedal system according to claim 1 wherein the at least one friction surface of the bearing device comprises two friction surfaces and the pedal has two sliding elements each having sliding surfaces, wherein the pairings of the sliding surfaces with the friction surfaces are axially spaced apart from one another in an axial direction of the bearing axle.

8. A method for generating a force path having hysteresis when a pedal is actuated utilizing the pedal system of claim 1,
wherein when the pedal is moved from the first position to the second position, the normal force of a frictional pairing between the pedal and the friction surface is altered by means of a modification of lever ratios.

9. A pedal system for the generation of a force path having hysteresis when a pedal is actuated, said pedal system comprising
said pedal supported such that it can pivot between at least a first position and a second position, said pedal including:
a sliding element with a sliding surface, and
a bearing device with at least one friction surface for supporting the sliding surface of the sliding element,
wherein a frame is provided, in which the bearing device is supported such that it can pivot about a bearing axle,
wherein the frame has a frame friction surface and the sliding element has a frame sliding surface and
wherein the frame friction surface and the frame sliding surface are in contact with one another in a first contact section when the pedal is in the first position, and are in contact with one another in a second contact section when the pedal is in the second position, wherein the first contact section and the second contact section have different lever arms to the bearing axle.

* * * * *